(12) United States Patent
Yoshino et al.

(10) Patent No.: US 10,428,865 B2
(45) Date of Patent: Oct. 1, 2019

(54) FOIL BEARING, PRODUCTION METHOD THEREFOR, AND INTERMEDIATE PRODUCT OF FOIL BEARING

(71) Applicant: NTN CORPORATION, Osaka (JP)

(72) Inventors: Masato Yoshino, Mie (JP); Hiroki Fujiwara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/770,587

(22) PCT Filed: Oct. 26, 2016

(86) PCT No.: PCT/JP2016/081729
§ 371 (c)(1),
(2) Date: Apr. 24, 2018

(87) PCT Pub. No.: WO2017/073613
PCT Pub. Date: May 4, 2017

(65) Prior Publication Data
US 2018/0313400 A1 Nov. 1, 2018

(30) Foreign Application Priority Data

Oct. 28, 2015 (JP) .................................. 2015-211919

(51) Int. Cl.
*F16C 32/06* (2006.01)
*F16C 17/02* (2006.01)
(Continued)

(52) U.S. Cl.
CPC ............ *F16C 17/024* (2013.01); *F16C 27/02* (2013.01); *F16C 33/101* (2013.01);
(Continued)

(58) Field of Classification Search
CPC ...... F16C 17/024; F16C 17/042; F16C 27/02; F16C 32/0603; F16C 33/101; F16C 43/02; F16C 2360/24
See application file for complete search history.

(56) References Cited

U.S. PATENT DOCUMENTS

| 3,957,317 A | 5/1976 | Silver | |
|---|---|---|---|
| 2014/0169707 A1* | 6/2014 | Yoshino | F16C 17/042 384/105 |

(Continued)

FOREIGN PATENT DOCUMENTS

| JP | 2012092967 A * | 5/2012 | ........... F01D 25/166 |
|---|---|---|---|
| JP | 2015-113928 | 6/2015 | |

(Continued)

OTHER PUBLICATIONS

International Search Report dated Jan. 24, 2017 in International (PCT) Application No. PCT/JP2016/081729.
(Continued)

*Primary Examiner* — Phillip A Johnson
(74) *Attorney, Agent, or Firm* — Wenderoth, Lind & Ponack, L.L.P.

(57) ABSTRACT

A foil bearing (40) includes foils (42) at a plurality of portions in a rotation direction of a shaft member (11). A top foil portion (Tf) including a bearing surface (S2) is formed in a region including a front end (421) of each of the foils (42), and a back foil portion (Bf) is formed in a region including a rear end (422) of each of the foils (42). A gap (C1) is secured between, of two of the foils adjacent to the foil (42) in a rotation direction (R) and a direction opposite to the rotation direction, the rear end (422) of the foil on the rotation direction side and the front end (421) of the foil on the side opposite to the rotation direction side. A width of the gap (C1) is set to be non-uniform in a direction (N) orthogonal to the rotation direction.

7 Claims, 13 Drawing Sheets

(51) Int. Cl.
*F16C 27/02* (2006.01)
*F16C 33/10* (2006.01)
*F16C 43/02* (2006.01)

(52) U.S. Cl.
CPC .......... *F16C 32/0603* (2013.01); *F16C 43/02* (2013.01); *F16C 2360/24* (2013.01)

(56) References Cited

U.S. PATENT DOCUMENTS

| | | | |
|---|---|---|---|
| 2014/0226925 A1* | 8/2014 | Yoshino | F16C 17/024 384/103 |
| 2016/0186799 A1* | 6/2016 | Yoshino | F01D 25/22 384/105 |
| 2016/0356310 A1 | 12/2016 | Yoshino et al. | |
| 2017/0089389 A1 | 3/2017 | Midoumae et al. | |

FOREIGN PATENT DOCUMENTS

| | | |
|---|---|---|
| WO | 2015/087677 | 6/2015 |
| WO | 2015/141806 | 9/2015 |

OTHER PUBLICATIONS

International Preliminary Report on Patentability and Written Opinion of the International Searching Authority dated May 1, 2018 in International (PCT) Application No. PCT/JP2016/081729.
Extended European Search Report dated Jun. 4, 2019 in corresponding European Patent Application No. 16859842.3.

\* cited by examiner r2<r1 r2<r1

FOIL BEARING, PRODUCTION METHOD THEREFOR, AND INTERMEDIATE PRODUCT OF FOIL BEARING

TECHNICAL FIELD

The present invention relates to a foil bearing, a manufacturing method therefor, and an intermediate product of the foil bearing.

BACKGROUND ART

A bearing configured to support a main shaft of a turbo machine, such as a gas turbine or a turbocharger, is required to endure severe environments involving high temperature and high speed rotation. Focus has been given on a foil bearing as a bearing which is suitable for use under such severe conditions. The foil bearing has bearing surfaces formed of flexible thin films (foils) having low flexural rigidity. During rotation of the shaft, fluid films (for example, air films) are formed in bearing gaps formed between the shaft and the bearing surfaces of the foils, and the shaft is supported in a non-contact manner. With the foil bearing having the bearing surfaces formed of the foils, the bearing surfaces are allowed to be deflected, and the bearing surfaces are deformable along with, for example, displacement or thermal expansion of the shaft. Accordingly, there is an advantage in that the shaft can stably be supported even under severe conditions.

As an example of the foil bearing, a foil bearing described in JP 2015-113928 A (Patent Literature 1) is publicly known. In Patent Literature 1, there is disclosed the following thrust foil bearing. Specifically, two foil members each including a plurality of foils are overlapped with each other, and, while the foils of the foil member on an upper side and the foils of the foil member on a lower side are shifted by a half pitch, a portion of each foil on a downstream side in a rotation direction is arranged so as to be overlapped on a portion of an adjacent foil on an upstream side in the rotation direction. In the thrust foil bearing, the portion of each foil on the downstream side in the rotation direction functions as a top foil portion forming a bearing surface, and the portion of each foil on the side opposite to the rotation direction side functions as a back foil portion configured to support the top foil portion from behind.

CITATION LIST

Patent Literature 1: JP 2015-113928 A

SUMMARY OF INVENTION

Technical Problem

Incidentally, according to a recent investigation conducted by the inventors of the present invention, it was found that, in the foil bearing in which the plurality of foils each including the top foil portion and the back foil portion were arranged in the rotation direction as described in Patent Literature 1, management of the stiffness in the vicinity of an end portion of the top foil portion on the downstream side in the rotation direction (vicinity of the front end) in the foil was important. When, for example, a portion having stiffness is partially present in the front end of the foil, followability with respect to, for example, displacement of a shaft is degraded in the region, and fluid is pushed out from a wedge-shaped bearing gap, with the result that there is a fear of causing degradation in floating effect of the shaft is lowered.

In view of the above, the present invention has an object to enable easy management of the stiffness of each foil, in particular, the stiffness of a top foil portion.

Solution to Problem

To achieve the above-mentioned object, according to one embodiment of the present invention, there is provided a foil bearing, comprising foils, which are arranged at a plurality of portions in a rotation direction of a shaft member to be supported, the foils each having a front end located on the rotation direction side, and a rear end located on a side opposite to the rotation direction side the foils each forming a top foil portion comprising a bearing surface in a region including the front end of the foil, and a back foil portion, which is arranged behind the top foil portion of adjacent one of the foils, in a region including the rear end of the foil, wherein a gap in the rotation direction is secured between, of two of the foils adjacent to any one of the foils in the rotation direction and the direction opposite to the rotation direction, the rear end of the foil on the rotation direction side and the front end of the foil on the side opposite to the rotation direction side, and wherein a width of the gap is set to be non-uniform in a direction orthogonal to the rotation direction.

As described above, the above-mentioned gap is set to be non-uniform in the direction orthogonal to the rotation direction. Thus, a support span of the intermediate foil sandwiched between the front end of the foil and the rear end of the foil (span of the front end and the rear end) is varied, thereby being capable of adjusting resiliency of the intermediate foil in respective regions in the direction orthogonal to the rotation direction. Therefore, the foils supported by the intermediate foil, in particular, the stiffness of the top foil portion (stiffness against the shearing force, which acts in the width direction of the bearing gap) can be partially varied, thereby being capable of managing the stiffness of the entire top foil portion. Therefore, followability of the bearing surface with respect to, for example, displacement or thermal expansion of the shaft member can be enhanced, thereby being capable of stabilizing the floating effect of the shaft member.

This effect can be obtained by, of the two of the foils, the rear end of the foil on the rotation direction side and the front end of the foil on the side opposite to the rotation direction side being formed to have contour shapes different from each other.

It is preferred that, of the two of the foils, the rear end of the foil on the rotation direction side be formed into a recessed shape, and the front end of the foil on the side opposite to the rotation direction side be formed into a protruding shape, and that a width of the gap formed by a top portion of the front end of the foil and a top portion of the rear end of the foil be set to be larger than a width of another region of the gap. In each of the foils having the above-mentioned shape, a peripheral region of the top portion of the front end tends to be a portion having high stiffness, and regions on both of the lateral sides thereof tend to be portions having low stiffness. However, through employment of the above-mentioned configuration, the stiffness of the top portion of the foil front end against the shearing force can be reduced, thereby being capable of equalizing the stiffness of the entire front end.

The configuration of the gap can be easily attained by forming the top portion of the front end of the foil and the top portion of the rear end of the foil into an arc shape, and by setting a curvature radius of the top portion of the front end of the foil to be larger than a curvature radius of the top portion of the rear end of the foil.

The width of the above-mentioned gap is set larger on one lateral end side than on another lateral end side of two lateral ends located on both the lateral sides of the front end of the foil, and thus the stiffness of the foil can be managed variously.

Further, according to one embodiment of the present invention, there is provided a manufacturing method for a foil bearing, the foil bearing comprising foils which are arranged at a plurality of portions in a rotation direction of a shaft member to be supported, the foils each having a front end located on the rotation direction side and a rear end located on a side opposite to the rotation direction side, the foils each forming a top foil portion including a bearing surface in a region comprising the front end of the foil, and a back foil portion, which is arranged behind the top foil portion of adjacent one of the foils, in a region including the rear end of the foil, the manufacturing method comprising: forming a plurality of foil members each integrally comprising the plurality of foils and a coupling portion for coupling the foils, the front end and the rear end between the adjacent foils of each of the foil members having contour shapes different from each other; and introducing the foils of another of the foil members into parts between the adjacent foils of one of the foil member so that the foils are partially overlapped with each other, to thereby form the top foil portions and the back foil portions.

Further, according to one embodiment of the present invention, there is provided an intermediate product for manufacturing a foil bearing, the foil bearing comprising foils which are arranged at a plurality of portions in a rotation direction of a shaft member to be supported, the foils each having a front end located on the rotation direction side and a rear end located on a side opposite to the rotation direction side, the foils each forming a top foil portion comprising a bearing surface in a region including the front end of the foil and a back foil portion, which is arranged behind the top foil portion of adjacent one of the foils, in a region including the rear end of the foil, the intermediate product comprising a plurality of foil members each integrally comprising the plurality of foils and a coupling portion for coupling the foils, the front end and the rear end between the adjacent foils of each of the foil members having contour shapes different from each other, wherein the foils of another of the foil members are introduced into parts between the adjacent foils of one of the foil member so that the foils are partially overlapped with each other, to thereby form the top foil portions and the back foil portions.

Advantageous Effects of Invention

According to the present invention, it is possible to easily manage the stiffness of each foil, in particular, the stiffness of a top foil portion. Therefore, the floating effect of the shaft member can be stabilized, thereby being capable of obtaining a stabilized bearing function even under severe conditions.

DESCRIPTION OF EMBODIMENTS

Figure 1:
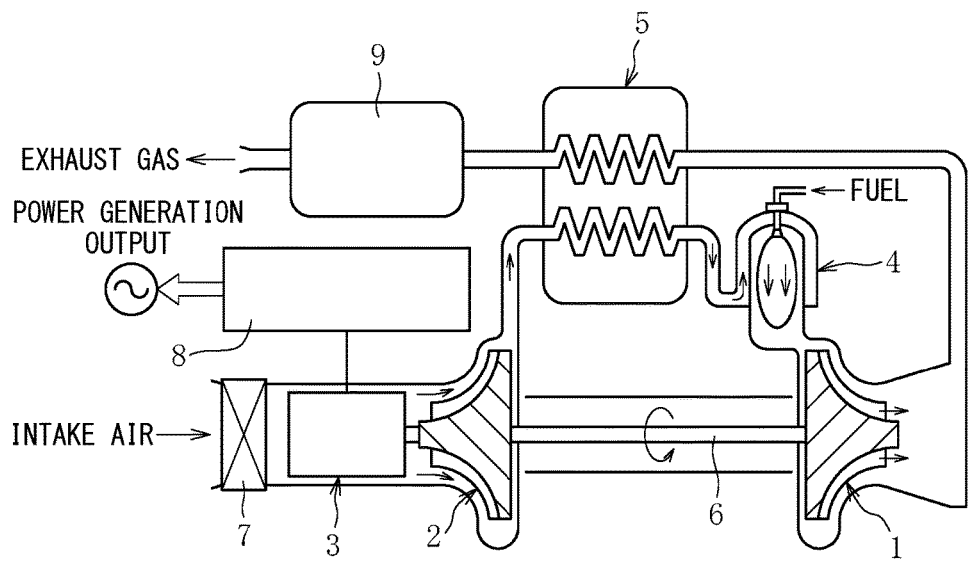
FIG. 1 is a schematic view for illustrating a configuration of a gas turbine.

FIG. 1 is a schematic view for illustrating a configuration of a gas turbine as a type of a turbo machine. The gas turbine mainly comprises a turbine 1 and a compressor 2, which respectively comprise blade cascades, a power generator 3, a combustor 4, and a regenerator 5. The turbine 1, the compressor 2, and the power generator 3 comprise a common rotary shaft 6 extending in a horizontal direction. The rotary shaft 6, the turbine 1, and the compressor 2 serve as an integrally rotatable rotor. Air sucked from an air-intake port 7 is compressed by the compressor 2, heated by the regenerator 5, and then fed into the combustor 4. The compressed air is mixed with fuel and combusted so as to rotate the turbine 1 with a high-temperature and high-pressure gas. A rotational force of the turbine 1 is transmitted to the power generator 3 through the rotary shaft 6 so as to rotate the power generator 3. Through the rotation of the power generator 3, electric power is generated and output through intermediation of an inverter 8. The gas having rotated the turbine 1 has a relatively high temperature. Thus, the gas is fed into the regenerator 5 so that heat exchange is performed with the compressed air prior to the combustion. Through the heat exchange, the heat of the gas after the combustion is reused. The gas that has been subjected to the heat exchange in the regenerator 5 passes through an exhaust heat recovery device 9, and then is exhausted as an exhaust gas.

Figure 2:
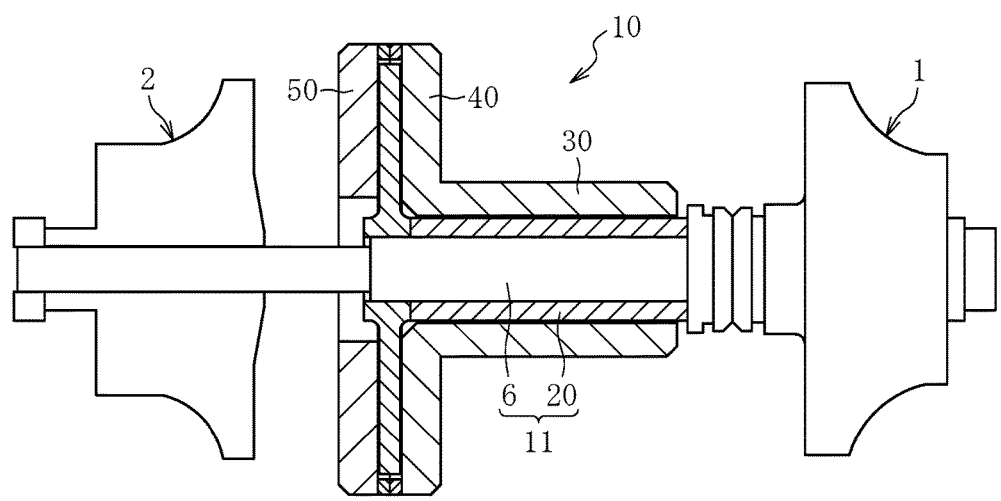
FIG. 2 is a sectional view for illustrating a support structure for a rotor of the gas turbine.

FIG. 2 is an illustration of a foil bearing unit 10 configured to support the rotary shaft 6 of the rotor in the gas turbine. The foil bearing unit 10 comprises a rotary shaft 6, a rotary member 20 fixed to the rotary shaft 6, a radial foil bearing 30, a first thrust foil bearing 40, and a second thrust foil bearing 50. The rotary shaft 6 and the rotary member 20, which are integrally rotatable, construct the shaft member 11. The radial foil bearing 30 supports the shaft member 11 in a radial direction, and the first thrust foil bearing 40 and the second thrust foil bearing 50 support the shaft member 11 in both thrust directions.

Figure 3:
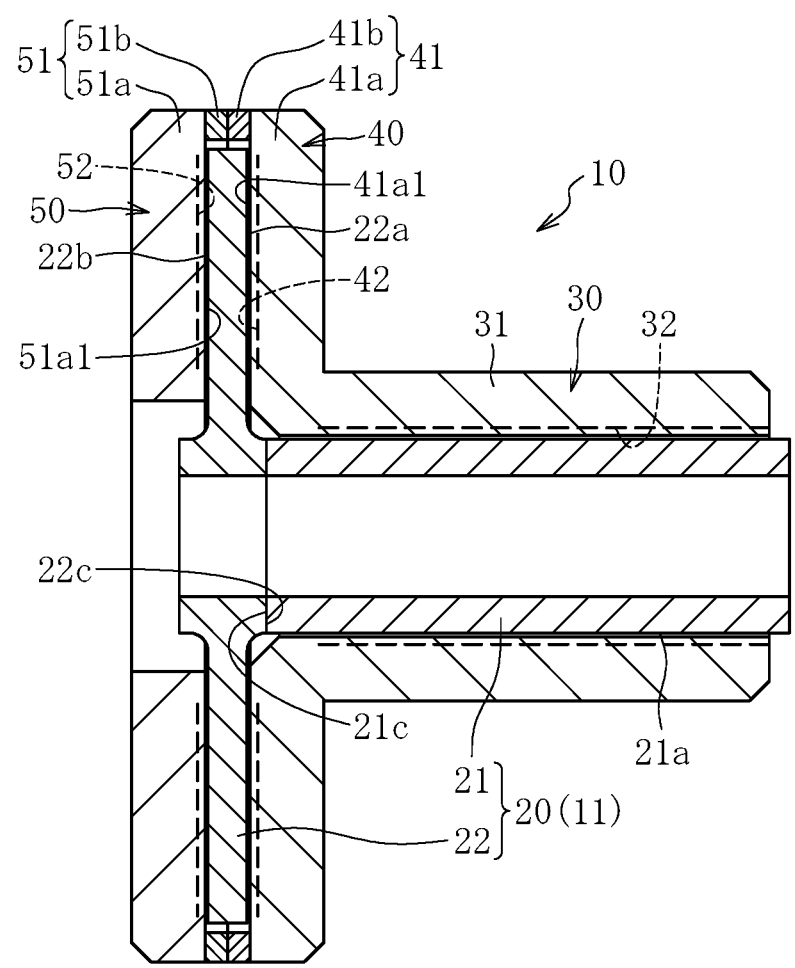
FIG. 3 is a sectional view for illustrating a foil bearing unit assembled in the support structure.

As illustrated in FIG. 3, the rotary member 20 comprises a sleeve portion 21, and a disc-like flange portion 22 projecting from the sleeve portion 21 to a radially outer side. The flange portion 22 is made of, for example, a carbon fiber reinforced composite, and the sleeve portion 21 is made of, for example, a sintered carbon material.

Figure 4:
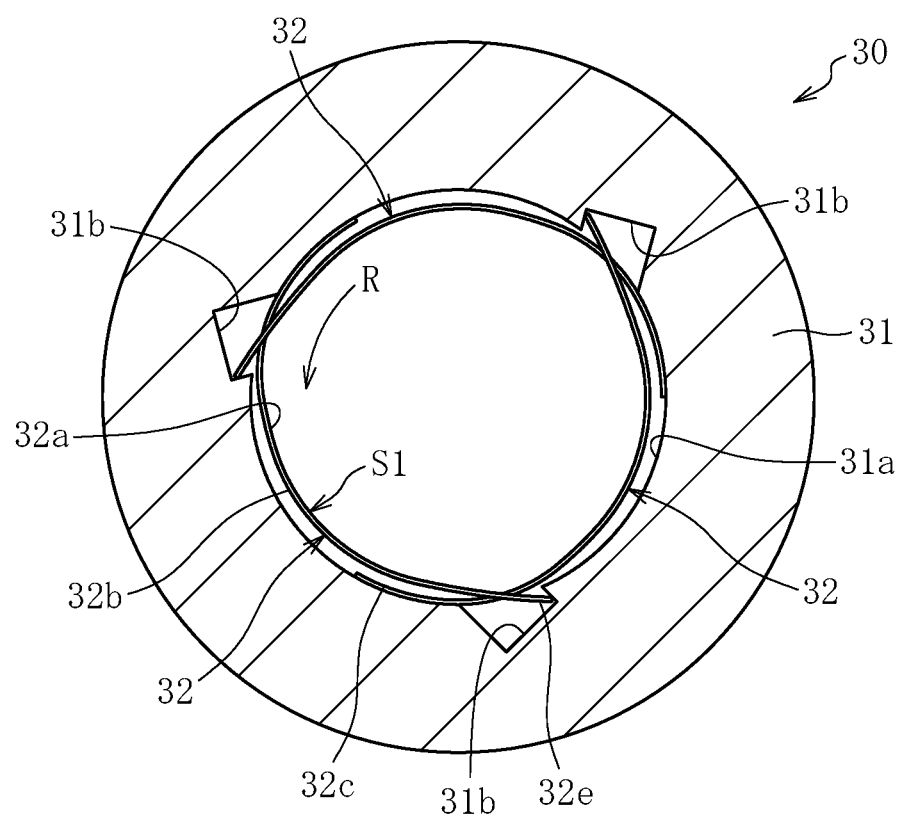
FIG. 4 is a sectional view for illustrating a radial foil bearing assembled in the foil bearing unit.

As illustrated in FIG. 4, the radial foil bearing 30 comprises a foil holder 31 having a tubular shape (cylindrical shape in the illustrated example), and a plurality of (three in the illustrated example) foils 32 mounted to an inner peripheral surface of the foil holder 31. The plurality of foils 32 are arrayed on the inner peripheral surface of the foil holder 31 in the circumferential direction.

Grooves 31b are formed in an inner peripheral surface 31a of the foil holder 31. In this embodiment, the grooves 31b each extending in an axial direction are formed in the foil holder 31 at a plurality of (three in the illustrated example) equiangular positions. The foil holder 31 is made of a metal, and is, for example, integrally formed including the grooves 31b through die molding. The foil holder 31 of this embodiment is integrally formed through die molding of a sintered metal. When the foil bearing unit 10 is used under a relatively low temperature environment, the foil holder 31 may be formed through die molding of a resin.

Figure 5A:
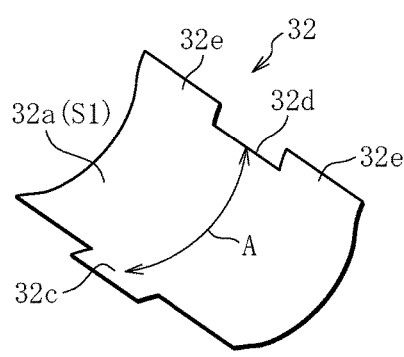
FIG. 5A is a perspective view for illustrating a foil of the above-mentioned radial foil bearing.
Figure 5B:
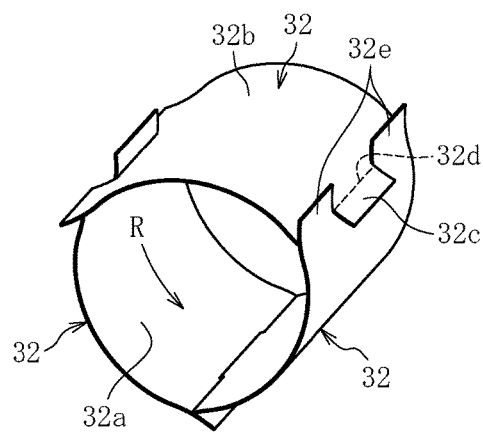
FIG. 5B is a perspective view for illustrating a state in which three foils are temporarily assembled.

As illustrated in FIG. 5A, each of the foils 32 comprises a projecting portion 32c formed at one circumferential end, and a recessed portion 32d formed at another circumferential end. The projecting portion 32c and the recessed portion 32d of each of the foils 32 are formed at the same position in the axial direction. As illustrated in FIG. 5B, the projecting portion 32c of each of the foils 32 may be fitted to the recessed portion 32d of adjacent one of the foils 32, thereby temporarily assembling the three foils 32 into a tubular shape. In this case, in the axial view illustrated in FIG. 4, the one end on a side opposite to a rotation direction side (projecting portion 32c) of each of the foils 32 and the another end in a rotation direction R side (projecting portions 32e on both axial sides of the recessed portion 32d) of the adjacent one of the foils 32 are intersected with each other. In this state, both the ends of each of the foils 32 are held on the foil holder 31. Specifically, the projecting portions 32e at the end on a rotation direction side of each of the foils 32 are inserted into each of the grooves 31b of the foil holder 31. The projecting portion 32c at the end on a side opposite to a rotation direction side of each of the foils 32 is arranged between a radially outer surface 32b of the adjacent one of the foils 32 and the inner peripheral surface 31a of the foil holder 31. In this case, movement of the plurality of foils 32 toward the rotation direction R side is regulated through abutment of the projecting portions 32e of each of the foils 32 against an inner wall of the grooves 31b. However, movement of the plurality of foils 32 toward the side opposite to the rotation direction side is not regulated. With this, the plurality of foils 32 are movable relative to the foil holder 31 in the circumferential direction.

Radially inner surfaces 32a of the foils 32 each function as a radial bearing surface S1 (see FIG. 4). In the illustrated example, three foils 32 form a multi-arc radial bearing surface S1. Additional members (such as back foils) configured to impart an elastic force to the foils 32 are not arranged between the inner peripheral surface 31a of the foil holder 31 and the foils 32 so that the radially outer surface 32b of each of the foils 32 and the inner peripheral surface 31a of the foil holder 31 are slidable relative to each other. The projecting portion 32c of each of the foils 32 is arranged on the radially outer side with respect to the radial bearing surface S1 of the adjacent one of the foils 32 so that the projecting portion 32c functions as an underfoil portion.

Next, configurations of the first thrust foil bearing 40 and the second thrust foil bearing 50 are described.

Figure 6A:
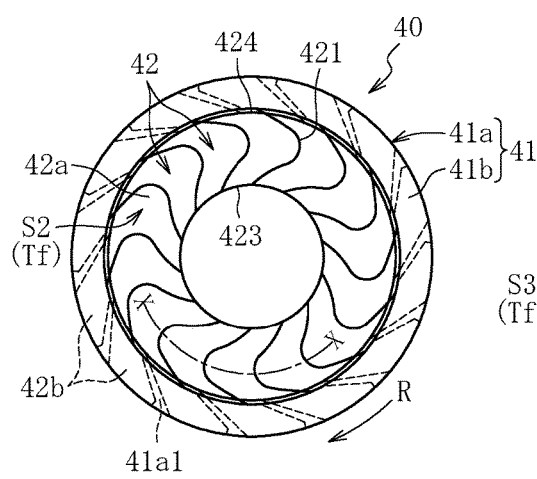
FIG. 6A is a plan view for illustrating a first thrust foil bearing.

The first thrust foil bearing 40 is configured to support the flange portion 22 of the rotary member 20 from one axial side as illustrated in FIG. 3, and comprises a foil holder 41 and plurality of foils 42 mounted to the foil holder 41, as illustrated in FIG. 3 and FIG. 6A. The foil holder 41 comprises a disc-like holder body 41a having a hole formed in an axial center and an annular fixing member 41b arranged on a radially outer rim of an end surface 41a1 of the holder body 41a. The foils 42 are sandwiched by the holder body 41a and the fixing member 41b from both sides in the axial direction so that the foils 42 are retained to the foil holder 41. In this embodiment, the holder body 41a of the foil holder 41 of the first thrust foil bearing 40 and the foil holder 31 of the radial foil bearing 30 are formed integrally with each other.

Figure 7:
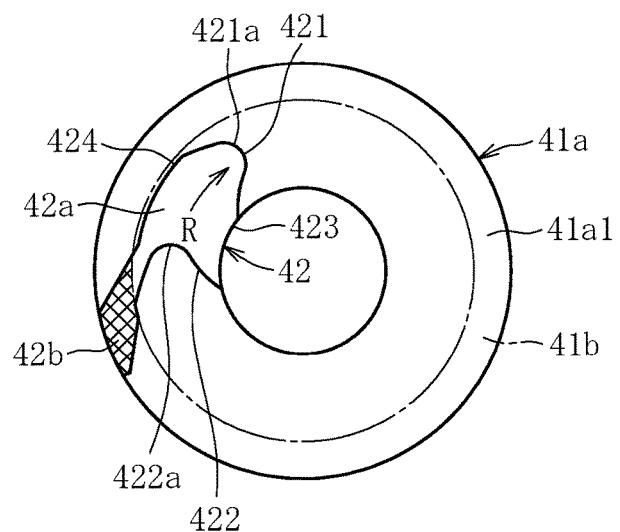
FIG. 7 is a plan view for illustrating a foil of the first thrust foil bearing.

As illustrated in FIG. 6A, the foils 42 are arranged at a plurality of positions in a rotation direction R (circumferential direction) at equiangular pitches. In FIG. 7, only one foil 42 of the plurality of foils 42 arrayed in the rotation direction R is illustrated, and illustration of the other foils is omitted. As illustrated in FIG. 7, each of the foils 42 integrally comprises a body portion 42a constructing a top foil portion Tf and a back foil portion Bf described later, and an extended portion 42b extending from the body portion 42a to the radially outer side.

The body portion 42a of the foil 42 has a front end 421 located on the rotation direction R side, a rear end 422 located on a side opposite to the rotation direction side, and lateral ends 423 and 424 continuous to the front end 421 at both lateral sides of the front end 421. The front end 421 and the rear end 422 each have a so-called herringbone pattern. The front end 421 is formed into a protruding shape that protrudes toward the rotation direction R side at a portion between both end portions thereof, and the rear end 422 is formed into a recessed shape that is recessed toward the rotation direction R side at a portion between both end portions thereof. The front end 421 and the rear end 422 comprise top portions 421a and 422a at center regions in a direction along a bearing surface S2 and a direction N orthogonal to the rotation direction R (radial direction in the case of the thrust foil bearing). In this embodiment, the case in which contour shapes of both the top portions 421a and 422a are formed into an arc is exemplified. Both the lateral ends 423 and 424 on the radially inner side and the radially outer side are formed by arcs with the axial center as the center.

The extended portion 42b is formed so as to extend in a direction inclined with respect to the radial direction by retreating a radially outer side of the body portion 42a from a radially outer end of the body portion 42a in a direction opposite to the rotation direction. As illustrated in FIG. 6A, the extended portions 42b arrayed in the rotation direction R are arranged on the same plane on the holder body 41a constructing the foil holder 41 without being overlapped with each other through a gap in the rotation direction R. The fixing member 41b is arranged on the extended portions 42b arrayed on the holder body 41a, radially outer parts of the extended portions 42b of the respective foils 42 (indicated by the crosshatching in FIG. 7) are sandwiched by the holder body 41a and the fixing member 41b, and both the members 41a and 41b are fixed to each other by fastening with a bolt or other fastener. In this manner, the foils 42 are fixed to the foil holder 41.

Figure 8:
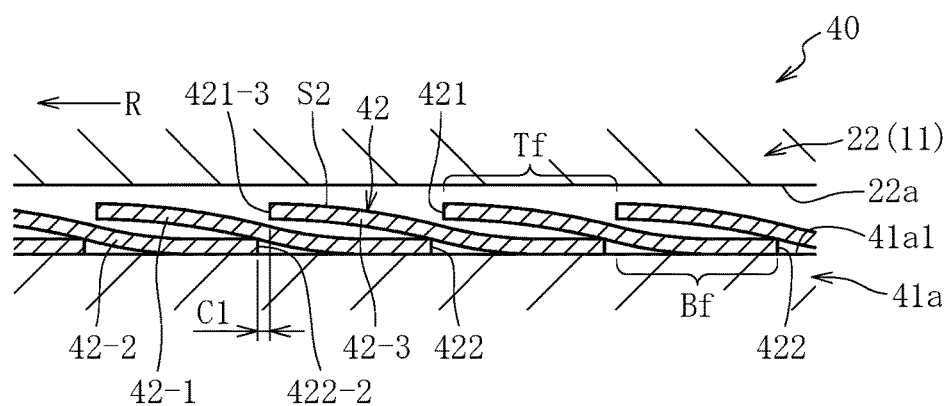
FIG. 8 is a developed view of a cross section taken along the line X-X of FIG. 6A.

FIG. 8 is a sectional view taken along the line X-X of FIG. 6A. As illustrated in FIG. 8, the foils 42 of the first thrust foil bearing 40 are arranged on the end surface 41a1 of the holder body 41a so as to be partially overlapped with one another in the rotation direction R while phases of the foils 42 are shifted by a half pitch of each of the foils 42. A region of each foil 42 on a downstream side in the rotation direction, which includes the front end 421 thereof, constructs the top foil portion Tf that overrides on the adjacent foil 42. Further, a region of each foil 42 on the side opposite to the rotation direction side, which includes the rear end 422 thereof, constructs the back foil portion Bf that supports the top foil portion Tf of the adjacent foil 42 from behind the top foil portion Tf. With a front surface of the top foil portion Tf of each foil 42, the thrust bearing surface S2 opposed to one end surface 22a of the flange portion 22 is formed.

The first thrust foil bearing 40 described above can be manufactured by the following procedure. Although the foil holder 31 of the radial foil bearing 30 is integrally formed on the holder body 41a of the foil holder 41 of the first thrust foil bearing 40, description is made below while the foil holder 31 is omitted for the sake of simplicity of description.

Figure 9A:
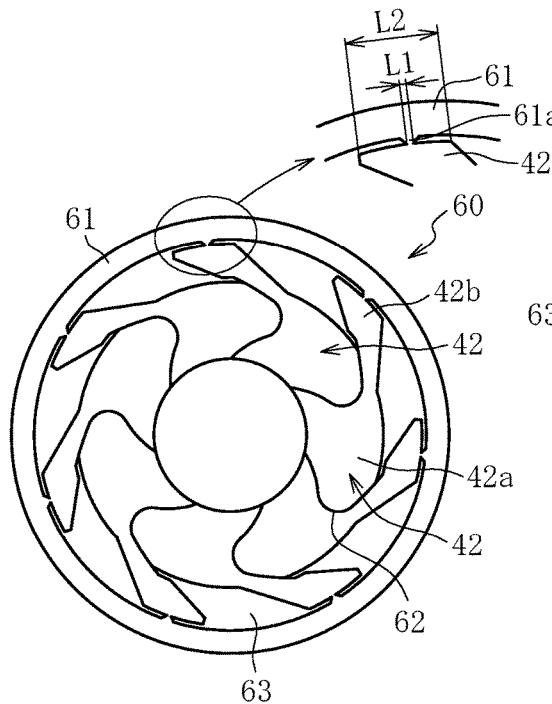
FIG. 9A is a plan view for illustrating a foil member formed by coupling a plurality of foils.
Figure 9B:
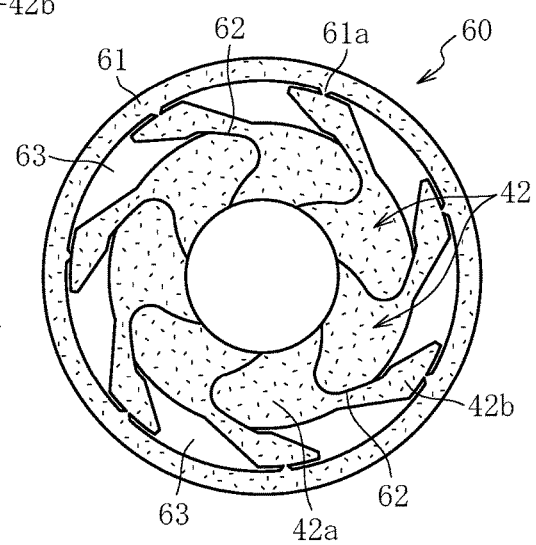
FIG. 9B is a plan view for illustrating a foil member formed by coupling the plurality of foils.

First, as illustrated in FIG. 9A and FIG. 9B, two foil members 60 having the same shape are manufactured (one foil member 60 is illustrated with dots for easy understanding in FIGS. 9 to FIG. 12). In each of the foil members 60, through, for example, press working or wire cutting on a foil material, the plurality of foils 42 and an annular coupling portion 61 for coupling radially outer ends of the plurality of foils 42 are integrally formed. Each of the foil members 60 comprises half the number of foils 42 to be assembled into the first thrust foil bearing 40, which are provided at equal intervals along the rotation direction R. The body portions 42a of the adjacent foils 42 are divided by a slit 62. Apart between the extended portions 42b of the adjacent foils 42 is punched out into a space 63. The extended portion 42b of each foil 42 is retained to the coupling portion 61 through a joining portion 61a. A circumferential dimension L1 of the joining portion 61a is smaller than a circumferential dimension L2 of a radially outer end of the extended portion 42b of each foil 42.

Figure 10:
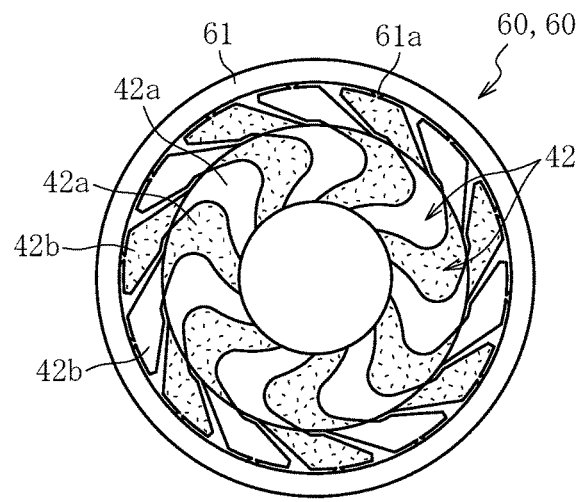
FIG. 10 is a plan view for illustrating a state in which the two foil members are temporarily assembled.

Next, as illustrated in FIG. 10, the one foil member 60 and the another foil member 60 are overlapped with each other. At this time, the two foil members 60 are shifted from each other by a half pitch of each of the foils 42, and parts of the foils 42 (body portions 42a) of the one foil member 60 on the downstream side in the rotation direction R are arranged on parts of the foils 42 (body portions 42a) of the another foil member 60 on the side opposite to the rotation direction side through the slits 62.

Figure 11:
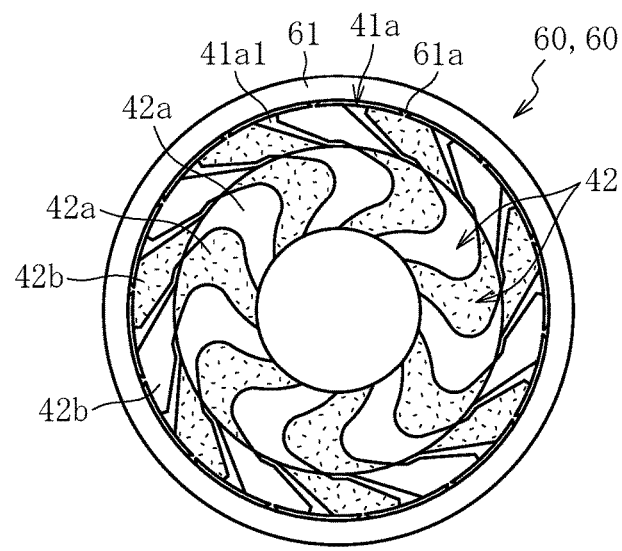
FIG. 11 is a plan view for illustrating a state in which the two temporarily assembled foil members are arranged on a holder body of a foil holder.
Figure 12:
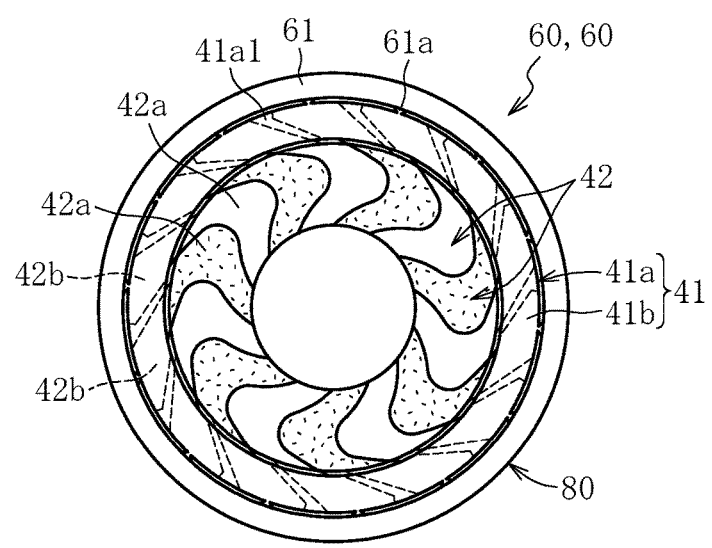
FIG. 12 is a plan view for illustrating a state in which a fixing member is mounted to the holder body illustrated in FIG. 11.

After that, the two foil members 60 temporarily assembled as described above are arranged on the end surface 41a1 of the holder body 41a as illustrated in FIG. 11. At this time, the radially outer ends of the extended portions 42b of the respective foils 42 are arrayed along a radially outer end of the end surface 41a1 of the holder body 41a. Further, the coupling portions 61 of the foil members 60 are arranged on the radially outer side with respect to the holder body 41a. In this state, as illustrated in FIG. 12, the fixing member 41b is arranged on the foil members 60 on the holder body 41a, and the holder body 42a and the fixing member 41b are fixed to each other with a bolt or other fastener (not shown). With this, the foils 42 are fixed to the foil holder 41, and an intermediate product 80 of the foil bearing is completed.

After that, the joining portions 61a that project toward the radially outer side from the holder body 41a and the fixing member 41b are cut so as to separate the coupling portions 61 from the foils 42. With the procedure described above, the first thrust foil bearing 40 illustrated in FIG. 6A is completed. The coupling portions 61 may be separated from the foils 42 as described above, or the coupling portions 61 may be left without being separated. That is, the above-mentioned intermediate product 80 may be used as the first thrust foil bearing 40. In this case, it is preferred that outer diameter dimensions of the holder body 41a and the fixing member 41b be set larger than an outer diameter dimension of each of the coupling portions 61 so as to prevent the coupling portions 61 from projecting toward the radially outer side from the foil holder 41.

Figure 6B:
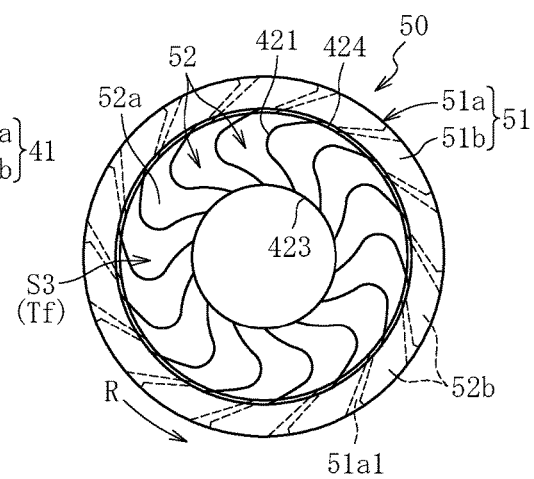
FIG. 6B is a plan view for illustrating a second thrust foil bearing.

As illustrated in FIG. 3, the second thrust foil bearing 50 is configured to support the flange portion 22 of the rotary member 20 from another axial side, and comprises a foil holder 51 and a plurality of foils 52 fixed to the foil holder 51, as illustrated in FIG. 6B. The foil holder 51 comprises a disc-like holder body 51a having a hole formed in an axial center and a fixing member 51b arranged on a radially outer rim of an end surface 51a1 of the holder body 51a. Each of the foils 52 comprises a body portion 52a and an extended portion 52b extending from the body portion to the radially outer side. A top foil portion Tf and a back foil portion Bf (see FIG. 8) are formed by the body portion 52a of each foil 52, and a thrust bearing surface S3, which is opposed to the other front surface 22b of the flange portion 22, is formed by a front surface of the top foil portion Tf of each foil 52. A shape of each member of the second thrust foil bearing 50 and an assembling method thereof are the same as those of the first thrust foil bearing 40, and hence redundant description thereof is omitted.

The material of the above-mentioned foils 32, 42, and 52 is made of a metal that is excellent in resiliency and processability, such as a steel material or a copper alloy, and having a thickness of from approximately 20 μm to approximately 200 μm. It is preferred that the foil material be made of stainless steel or bronze.

The foil bearing unit 10 illustrated in FIG. 3 having the configuration described above is assembled by the procedure as described below. First, the sleeve portion 21 of the rotary member 20 is inserted along an inner periphery of the radial foil bearing 30. After that, the second thrust foil bearing 50 is mounted so as to oppose to the first thrust foil bearing 40 so that the flange portion 22 of the rotary member 20 is sandwiched from both the axial sides. In this state, the fixing member 41b of the foil holder 41 of the first thrust foil bearing 40 and the fixing member 51b of the foil holder 51 of the second foil bearing 50 are brought into abutment against each other in the axial direction, and both the foil holders 41 and 51 are fixed with bolts or other fasteners (not shown). In this way, the foil bearing unit 10 is completed.

Next, the rotary shaft 6 is press-fitted and fixed to inner peripheries of the sleeve portion 21 and the flange portion 22, which construct the rotary member 20 of the foil bearing unit 10, and a part or an entirety of each of the foil holders 31, 41, and 51 of the foil bearings 30, 40, and 50 is fixed to a housing of the gas turbine. With this, the support structure for the gas turbine illustrated in FIG. 2 is completed. With this, the rotary shaft 6 and the rotary member 20 serve as the integrally rotatable shaft member 11, and rotation of the shaft member 11 is supported by the bearings (the radial foil bearing 30, the first thrust foil bearing 40, and the second thrust foil bearing 50).

In the radial foil bearing 30 illustrated in FIG. 4, each foil 32 is curved in a state of being eccentric with respect to an inner peripheral surface of the foil holder 31. Therefore, along with rotation of the shaft member 11 in one direction, a wedge-shaped space is formed between the radial bearing surface S1 of each foil 32 and an outer peripheral surface of the shaft member 11 (outer peripheral surface 21a of the sleeve portion 21 of the rotary member 20). With a fluid dynamic pressure generated in the wedge-shaped space, an annular radial bearing gap is formed between each foil 32 of the radial foil bearing 30 and the outer peripheral surface of the shaft member 11. In this manner, the shaft member 11 is supported in the radial direction in a non-contact manner.

Further, in the first thrust foil bearing 40 illustrated in FIG. 6A and FIG. 6B (also including the second thrust foil bearing 50), as illustrated in FIG. 8, the top foil portion Tf of each foil 42 overrides on the back foil portion Bf of each foil 42 through the slit 62 between the adjacent foils 42 (see FIG. 9A and FIG. 9B), and hence the top foil portion Tf stands in a state of being inclined. Therefore, along with rotation of the shaft member 11 in the one direction, a wedge-shaped space is formed between the thrust bearing surface S2 of each foil 42 and an end surface of the shaft member 11 (end surface 22a of the flange portion 22 of the rotary member 20). With a fluid dynamic pressure generated in the wedge-shaped space, the shaft member 11 is supported in the thrust direction in a non-contact manner.

At this time, due to flexibilities of the foils 32, 42, and 52, the bearing surfaces S1, S2, and S3 of the foils 32, 42, and 52 are suitably deformed in accordance with operating conditions such as a load, a rotation speed of the shaft member 11, and an ambient temperature. Thus, the radial bearing gap and the thrust bearing gaps are automatically adjusted so as to have appropriate widths in accordance with the operating conditions. As a result, even under severe conditions involving high temperature and high speed rotation, the radial bearing gap and the thrust bearing gaps may be managed so as to have optimum widths, and hence the rotary member 20 and the shaft member 11 may be stably supported.

During the low speed rotation immediately before the stop or immediately after the actuation of the shaft member 11, the bearing surfaces of the foils 32, 42, and 52(in particular, a bearing surface of each of the foils 32 of the radial foil bearing 30) and the rotary member 20 come into sliding contact with each other. Thus, low-friction coating such as a DLC film, a titanium aluminum nitride film, a tungsten disulfide film, and a molybdenum disulfide film may be formed on one or both of the bearing surface of each of the foils and the rotary member 20. Further, during the rotation of the shaft member 11, due to the slight sliding between each of the foils 32, 42, and 52 and each of the foil holders 31, 41, and 51, the vibration of the shaft member 11 can be suppressed. In order to adjust a frictional force that is generated by the slight sliding, the low-friction coating as described above maybe formed on one or both of each of the foils 32, 42, and 52 and each of the foil holders 31, 41, and 51.

Incidentally, through a verification process of the foil bearing by the inventors of the present invention, it was found that, in a case of the foil bearing comprising the foils 42, which each comprise the portion that functions as the top foil portion Tf, and the portion that functions as the back foil portion Bf, arranged at a plurality of portions in the rotation direction R as in a case of the first thrust foil bearing 40 (also including the second thrust foil bearing 50), the stiffness of each foil 42, in particular, the stiffness of the top foil portion Tf had a significant influence on the bearing performance.

[Verification 1]

For example, in a manufacturing process for the foil member 60 illustrated in FIG. 9A and FIG. 9B, the body portion 42a of each foil 42 is divided by the slit 62. When the slit 62 is formed by wire cutting, the width of the slit 62 is micro (from several μm to several tens of μm), and hence the slit 62 is seen as a line to the naked eye.

Figure 13:
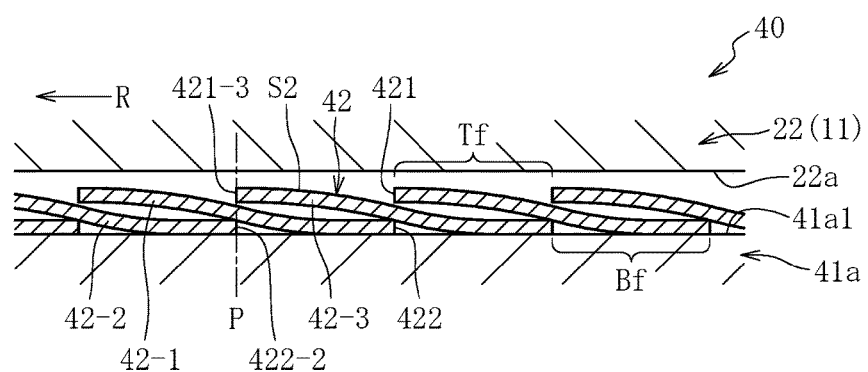
FIG. 13 is a developed view of a cross section taken along the line X-X of FIG. 6A in a comparative example.

FIG. 13 is a view corresponding to FIG. 8, and is a sectional view for illustrating a comparative example (Patent Literature 1) in which the slit 62 is formed so as to have a micro width by wire cutting as described above. In this case, after the assembly of the foil bearing, of two foils 42-2 and 42-3 adjacent to any one of the foils (for example, reference symbol 42-1) in the rotation direction R and the direction opposite to the rotation direction, a rear end 422-2 of the foil 42-2 on the rotation direction R side and a front end 421-3 of the foil 42-3 on the side opposite to the rotation direction side are located on substantially the same plane P. On the plane P, three foils are overlapped with one another, and hence the resiliency of the foil 42-1 interposed between the front end 421-3 and the rear end 422-2 on the plane P (hereinafter referred to as "intermediate foil") is reduced. Therefore, the stiffness of the foil 42-3 supported by the intermediate foil 42-1, in particular, the stiffness of the front end 421-3 is increased as a whole. The stiffness herein refers to stiffness against a shearing force that acts in a width direction of the bearing gap (up-and-down direction in FIG. 8 and FIG. 13).

When the stiffness of the front end 421 is increased as described above, followability of the front end 421 with respect to, for example, displacement of the shaft member 11 is reduced so that fluid is easily released from the wedge-shaped space at the time of, for example, displacement of the shaft member 11. Therefore, a floating effect of the shaft member 11 becomes unstable, with the result that there is a fear of causing the foils 42 to be brought into contact with the shaft member 11 in the worst case.

Figure 14:
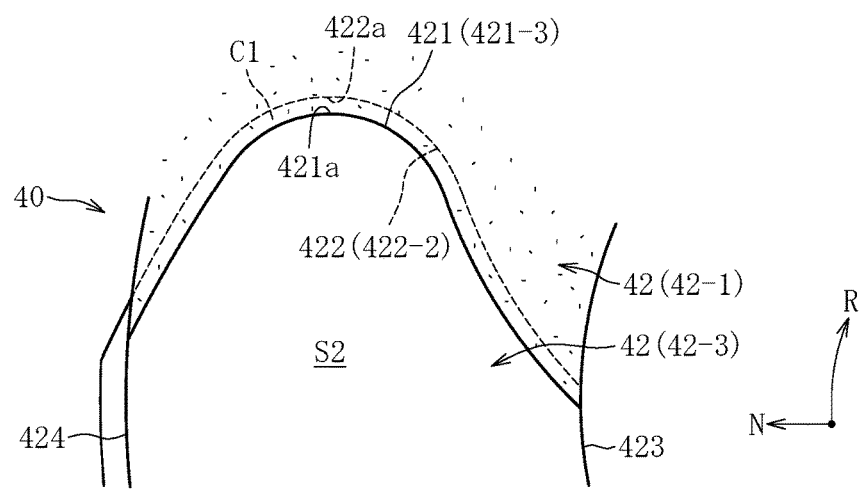
FIG. 14 is an enlarged plan view for illustrating the foil of the first thrust foil bearing.

In order to avoid such defect, in the present invention, as illustrated in FIG. 8 and FIG. 14, of the two foils 42-2 and 42-3 adjacent to the intermediate foil 42-1 in the rotation direction R and the direction opposite to the rotation direction, the rear end 422-2 of the foil 42-2 on the rotation direction R side and the front end 421-3 of the foil 42-3 on the side opposite to the rotation direction side are offset in the rotation direction R so as to secure a gap C1 in the rotation direction R between the front end 421-3 and the rear end 422-2. That is, the rear end 422-2 of the foil 42-2 on the rotation direction R side is positioned on the downstream side in the rotation direction R with respect to the front end 421-3 of the foil 42-3 on the side opposite to the rotation direction side. The intermediate foil 42-1 corresponds to the foil 42 formed in the another foil member 60 illustrated in FIG. 9B, and hence, in FIG. 14, the intermediate foil 42-1 is indicated by a dotted pattern similarly to FIG. 6B (the same applies to FIG. 17, FIG. 19, and FIG. 20).

Figure 15:
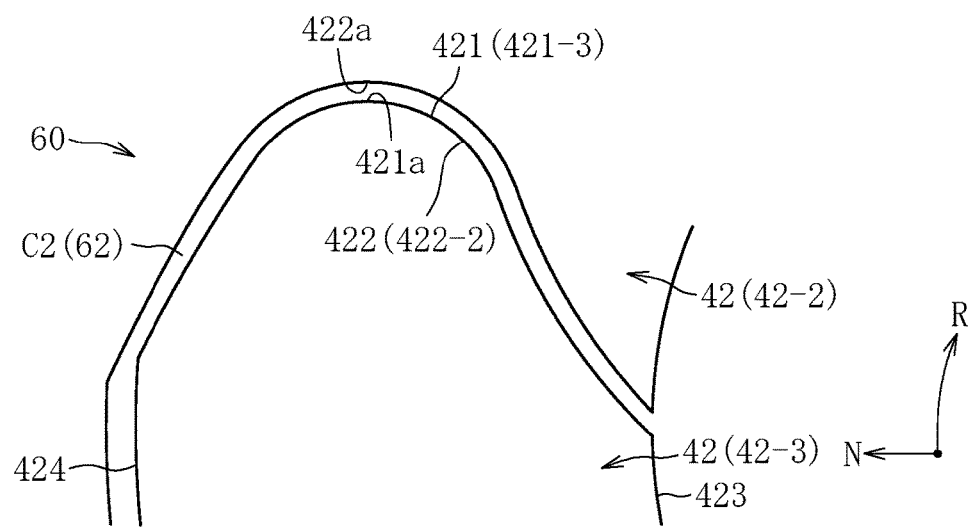
FIG. 15 is an enlarged plan view for illustrating the foil of the foil member.

The gap C1 can be formed by setting, when each of the foil members 60 illustrated in FIG. 9A and FIG. 9B is manufactured, as illustrated in FIG. 15, the width in the rotation direction R of the slit 62 for dividing the foils 42 of each of the foil members 60 to be large as a gap C2 so that the width of the gap C1 is approximately equal to the above-mentioned gap C1 (see FIG. 14).

As described above, the gap C1 is formed between the rear end (422-2) and the front end (421-3) of the different foils (42-2 and 42-3) located on the rear side (side opposite to the bearing gap side) and the front side (bearing gap side) of the intermediate foil 42-1 illustrated in FIG. 8, thereby increasing the resiliency effect of the intermediate foil 42-1 with respect to the front end (421-3). Therefore, the stiffness of the front end 421 of each foil 42 can be reduced, and the followability of the front end 421 with respect to the displacement of the shaft member 11 is increased, thereby being capable of preventing outflow of the fluid from the wedge-shaped space and contact between the foils 42 and the shaft member 11.

[Verification 2]

Figure 16:
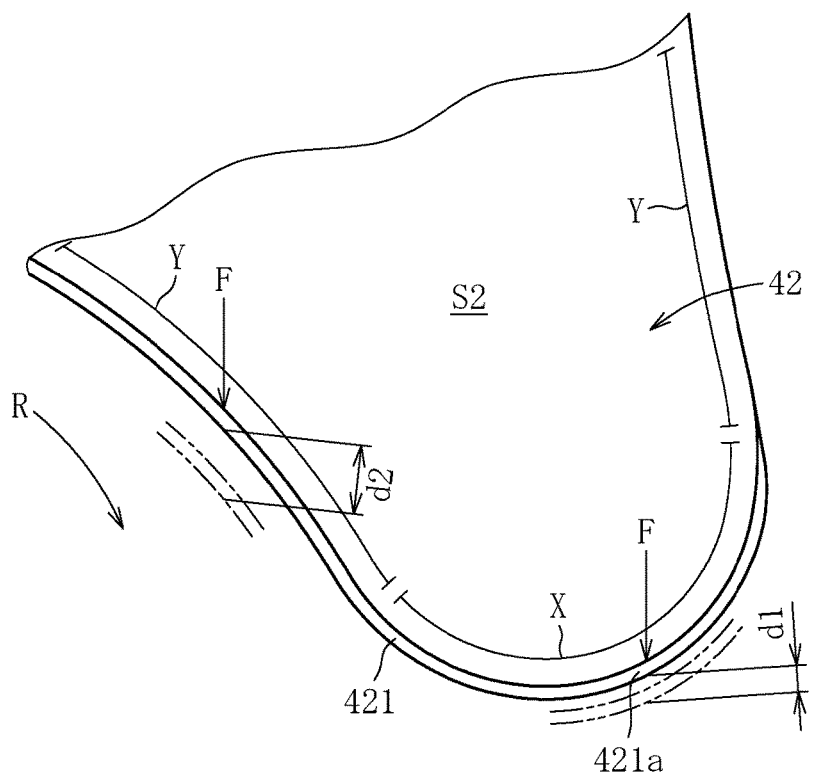
FIG. 16 is an enlarged perspective view for illustrating the foil of the first thrust foil bearing.

It is conceivable that the stiffness of the front end 421 of each foil 42 is not uniform, and differs in respective portions. For example, in the front end 421 illustrated in FIG. 7, in the vicinity of the top portion 421a having a shape reversed from the rotation direction R to the direction opposite to the rotation direction, the shape of the front end 421 is complicated as compared to regions on both lateral sides (the radially inner side and the radially outer side), and, correspondingly to the complication, the stiffness of the foil is increased. Therefore, when a shearing force F in the width direction of the bearing gap is applied to the front end 421 of each foil 42 as illustrated in FIG. 16, a deformation amount d2 of the foil 42 is increased on both lateral sides of the top portion 421a, whereas a deformation amount d1 of the foil 42 is reduced at the vicinity of the top portion 421a of the front end 421. In this case, a peripheral region of the top portion 421a of the front end 421 is a portion X having high stiffness, and meanwhile, regions on both the lateral sides thereof are portions Y having low stiffness. As described above, the portion X having high stiffness and the portions having low stiffness are generated in the front end 421. Thus, even when the gap C1 illustrated in FIG. 14 is formed, the state in which the stiffness of the top portion 421a is high is maintained. Therefore, the followability of the foil front end 421 with respect to, for example, the displacement of the shaft member 11 cannot sufficiently be secured, with the result that there is a fear of causing the same problem as that described above.

Figure 17:
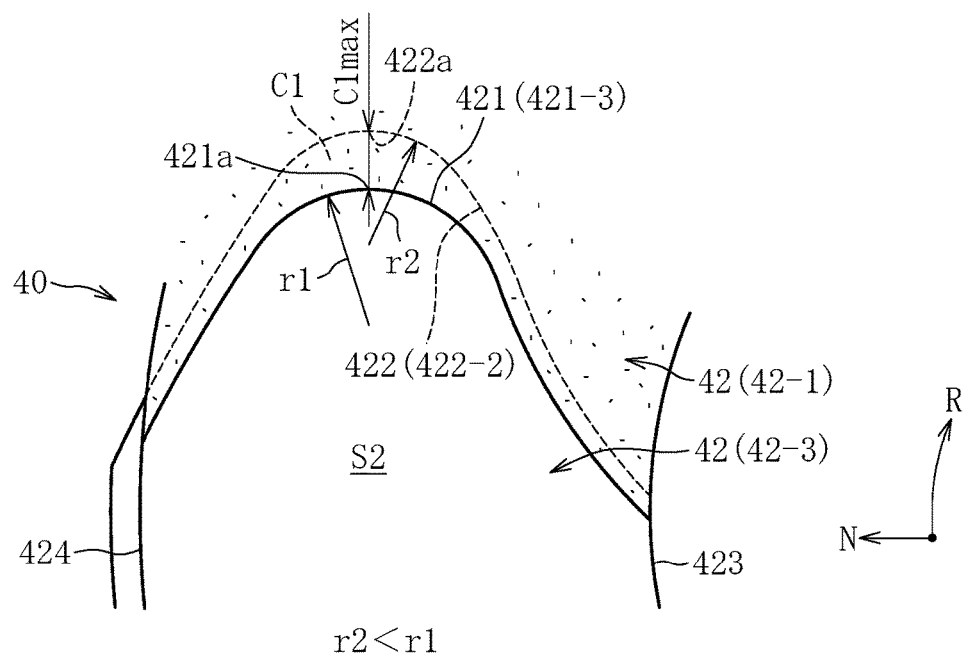
FIG. 17 is an enlarged plan view for illustrating the foil of the first thrust foil bearing.

Based on Verifications 1 and 2 described above, in the present invention, as illustrated in FIG. 8 and FIG. 17, the foil front end (421-3) and the foil rear end (422-2) on both the front and rear sides of the intermediate foil 42-1 are offset in the rotation direction R so as to secure the gap C1 therebetween, and, in addition, as illustrated in FIG. 17, the width of the gap C1 (which refers to the width in the rotation direction R; the same applies hereinafter) is set to be non-uniform along the bearing surface S2 and in the direction N orthogonal to the rotation direction R. Specifically, the width of the gap C1 is increased at the vicinity of the top portion 421a of the front end 421, whereas the width of the gap C1 is reduced on both the lateral sides of the top portion 421a. In particular, the gap C1 has a maximum width (C1max) at the top portion 421a. In this embodiment, there is exemplified the case in which the gap C1 having the above-mentioned form is formed by setting a curvature radius r1 of the top portion 421a of the front end 421-3 of the foil 42-3 on the side opposite to the rotation direction side to be larger than a curvature radius r2 of the top portion 422a of the rear end 422-2 of the foil 42-2 on the rotation direction R side (r1>r2).

During the rotation of the shaft member 11, due to the fluid pressure generated in the bearing gap, the front end 421-3 of the foil 42-3 on the side opposite to the rotation direction side is pressed against the intermediate foil 42-1 (see FIG. 8). At this time, as illustrated in FIG. 17, the gap C1 is set to be non-uniform in the direction N orthogonal to the rotation direction R, and thus, a support span of the intermediate foil 42-1 by the foil front end 421-3 and the foil rear end 422-2 is increased at the vicinity of the top portion 421a of the foil front end 421-3 as compared to both the lateral sides of the top portion 421a (portions Y having low stiffness). With this, the resiliency of the intermediate foil 42-1 is increased at the vicinity of the top portion 421a of the foil front end 421-3, and thus, the stiffness of the top portion 421a of the foil front end 421 against the above-mentioned shearing force F can be reduced, thereby being capable of equalizing the stiffness of the entire front end 421. Therefore, followability of the bearing surface S2 with respect to, for example, displacement or thermal expansion of the shaft member 11 is increased, thereby being capable of stabilizing the floating effect of the shaft member 11.

Figure 18:
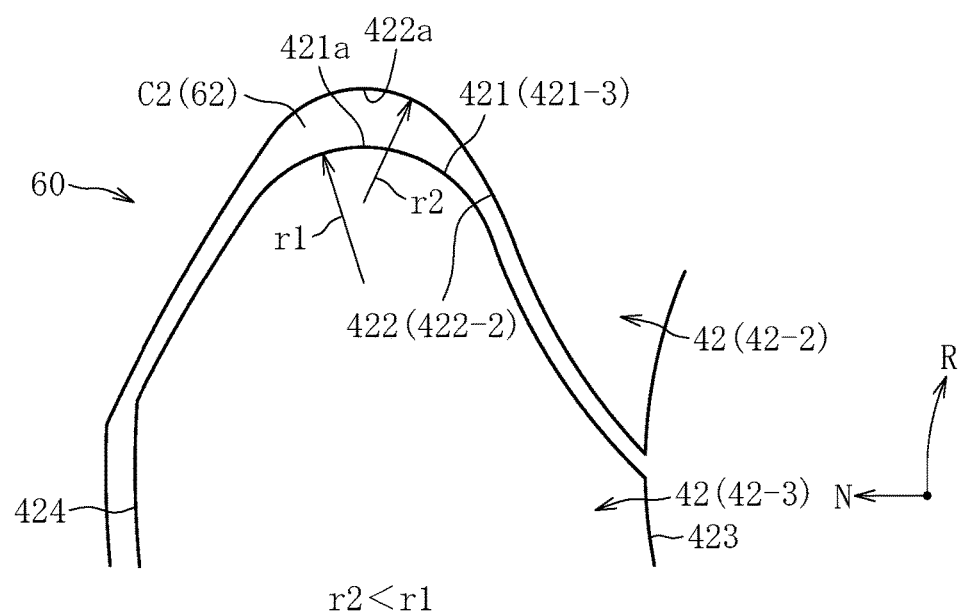
FIG. 18 is an enlarged plan view for illustrating the foil of the foil member.

As illustrated in FIG. 18 in an enlarged manner, the gap C1 described above can be formed by performing material removal through press working or other processing so that the slit 62 of each of the foil members 60 becomes the gap C2 having a shape in conformity with the shape of the gap C1 illustrated in FIG. 17 when the foil material is subjected to press working or the like at the manufacture stage of each of the foil members 60 illustrated in FIG. 9A and FIG. 9B.

When the foil bearing is manufactured by the procedure illustrated in FIGS. 9 to FIG. 12, in the related art, the slit 62 of each of the foil members 60 illustrated in FIG. 9A and FIG. 9B is formed by cutting (for example, wire cutting) without involving material removal in many cases. In this case, the front end 421 and the rear end 422 divided by the slit 62 have the same contour shape. In contrast, the present invention is different from the related-art foil bearing in that the front end 421 and the rear end 422 divided by the slit 62 have contour shapes different from each other.

When the width of the gap C1 is excessively large, the effect of causing the intermediate foil 42-1 illustrated in FIG. 8 to stand is weakened. Thus, the wedge-shaped space is less likely to be formed, thereby lowering the bearing performance. Therefore, the width of the portion having the smallest gap C1 is set to be approximately 1 mm at the maximum. As a matter of course, the upper limit value is varied depending on the bearing size, the thickness of the foil material to be used, the material characteristics, the use condition of the bearing, or the like. Therefore, the above-mentioned upper limit value is average. In any cases, it is not preferred to set the dimension of width of the gap C1 to be excessively large in terms of the bearing characteristics.

In the description above, as the managing method for the stiffness of the foil 42, the case in which the width of the gap C1 at the vicinity of the top portion 421a of the foil front end 421 is set larger than those of portions other than the gap C1 is exemplified. However, the managing method for the stiffness of the foil is not limited thereto, and methods described below may be employed.

As is apparent from FIG. 6A and FIG. 6B, in the first thrust foil bearing 40, in general, the length in the rotation direction of the lateral end 423 on the radially inner side of each foil 42 is smaller than the length in the rotation direction of the lateral end 424 on the radially outer side. Therefore, when both the lateral ends 423 and 424 are compared, the lateral end 423 on the radially inner side tends to have larger stiffness than the lateral end 424 on the radially outer side. When the difference in stiffness becomes a problem, as illustrated in FIG. 19, the stiffness of the foil 42 can partially be adjusted by setting the above-mentioned gap C1 to be larger on the radially inner side than on the radially outer side.

Figure 20:
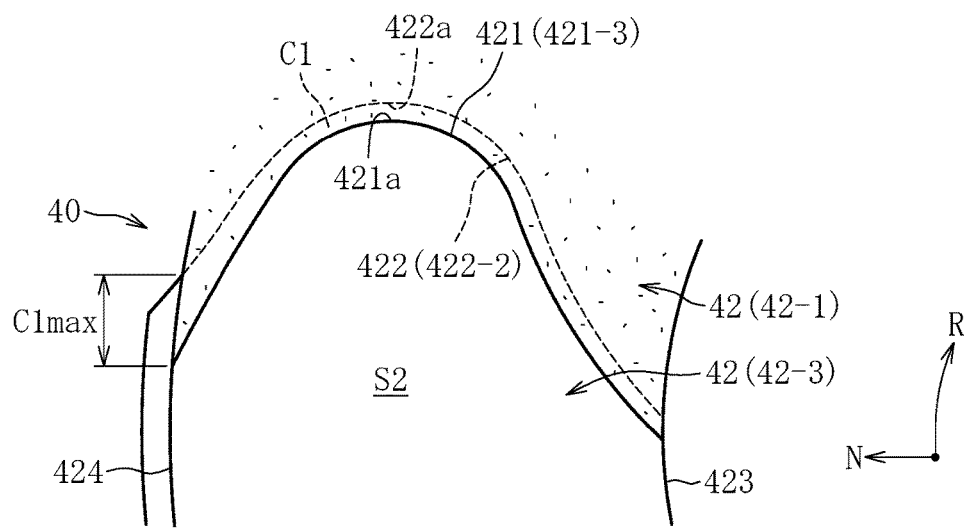
FIG. 20 is an enlarged plan view for illustrating the foil of the first thrust foil bearing.

Further, when it is expected that the shaft member 11 is whirled and conically rotated, the radially outer end of the shaft member 11 (flange portion 22) is liable to be brought into contact with the lateral end 424 on the radially outer side of the foil 42. In order to prevent such contact, it is effective to reduce the stiffness of the region on the radially outer side of each foil 42. Therefore, in this case, it is preferred that the width of the above-mentioned gap C1 be set larger on the radially outer side than on the radially inner side as illustrated in FIG. 20. With this, the region on the radially outer side of the foil 42 is easily deformed, and thus, the shaft member 11 being conically whirled can stably be supported.

Figure 19:
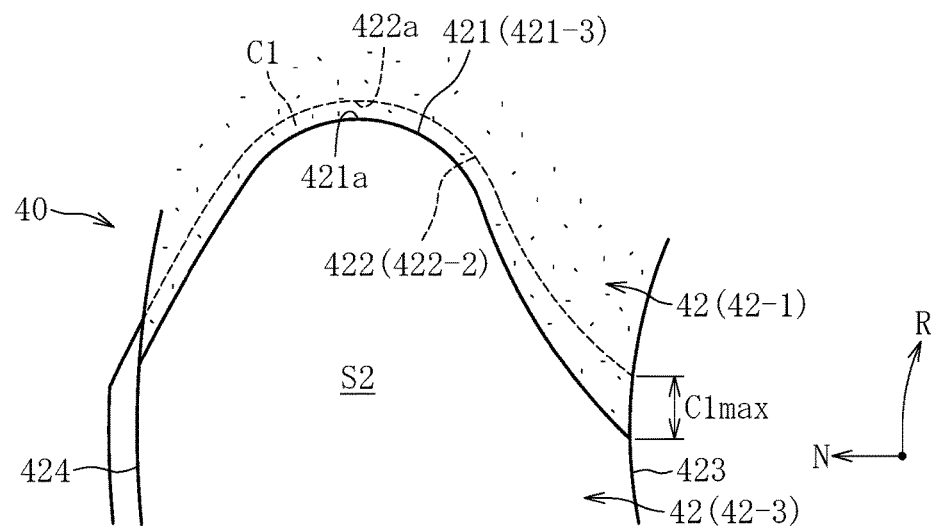
FIG. 19 is an enlarged plan view for illustrating the foil of the first thrust foil bearing.

As the gap C1 for managing the stiffness of the foil 42, the forms illustrated in FIG. 17, FIG. 19, and FIG. 20 are exemplified above. However, the form of the gap C1 is not limited to the forms exemplified above, and can suitably be determined depending on the difference in stiffness to be adjusted. For example, any one of the forms of the gap C1 illustrated in in FIG. 17, FIG. 19, and FIG. 20 may be selected, or two or more of the forms may suitably be combined. The stiffness of the foil 42 can be managed in multiple viewpoints by suitably changing the form of the gap C1 in accordance with the difference in stiffness caused in the foil (in particular, the top foil portion Tf) as described above.

Figure 21:
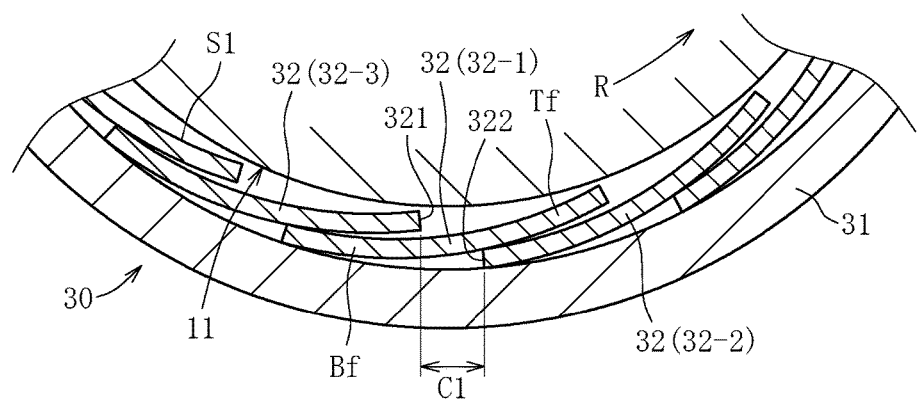
FIG. 21 is an enlarged sectional view for illustrating the radial foil bearing.

Further, in the description above, the case in which the present invention is applied to the first thrust foil bearing 40 (also including the second thrust foil bearing 50) is exemplified. However, when, as the radial foil bearing 30 illustrated in FIG. 2, there is used a foil bearing in which the plurality of foils 32 are arranged in the rotation direction R, and the portion that functions as the top foil portion Tf and the portion that functions as the back foil portion Bf are formed in each foil 32 as illustrated in FIG. 21, the present invention is also applicable to the radial foil bearing 30. Also in this case, of two foils (32-2 and 32-3) adjacent to any one of the foils (32-1) in the rotation direction R and the direction opposite to the rotation direction, a rear end 322 of the foil (32-2) on the rotation direction R side and a front end 321 of the foil (32-3) on the side opposite to the rotation direction side are offset in the rotation direction R so as to secure the gap C1 in the rotation direction R between both the ends 321 and 322, and the width of the gap C1 is set to be non-uniform along the bearing surface S1 and in the direction N orthogonal to the rotation direction R (axial direction illustrated in FIG. 24. With this, also in the radial foil bearing 30, the stiffness of each foil 32 is managed, thereby being capable of improving the bearing performance.

Figure 22:
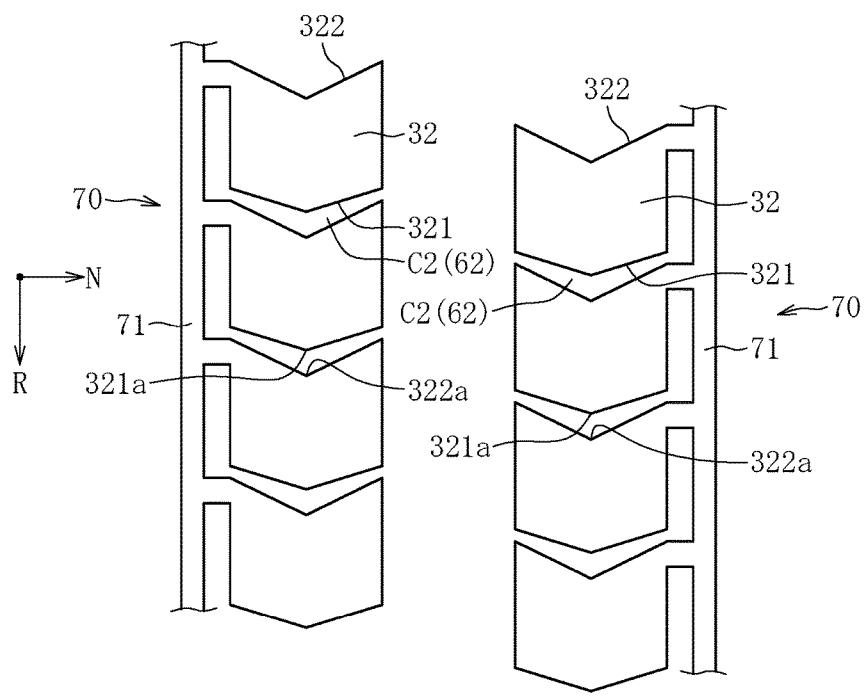
FIG. 22 is a plan view for illustrating foil members used in the radial foil bearing.
Figure 23:
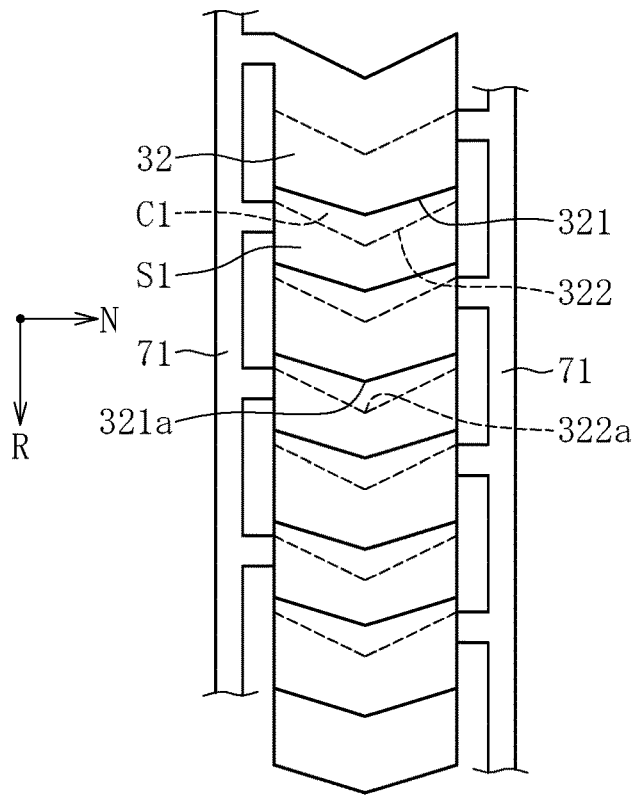
FIG. 23 is a plan view for illustrating a state in which the two foil members used in the radial foil bearing are temporarily assembled.

The radial foil bearing 30 can be assembled, for example, by the following procedure. First, as illustrated in FIG. 22, two foil members 70 each integrally comprising the plurality of foils 32 and a band-like coupling portion 71 for coupling the foils are manufactured. At this time, the slits 62 (gaps C2) are interposed between the foils 32 of each of the foil members 70. Next, one foil member 70 is reversed, and is arranged so as to be shifted by a half pitch of each of the foils 32 with respect to the another foil member 70. Then, as illustrated in FIG. 23, the two foil members 70 are overlapped with each other so that the foils 32 of the one foil member 70 are introduced into the slits 62 of the another foil member 70. Thereafter, the two foil members are rolled, and ends on one side thereof are mounted to the foil holder 31 (the coupling portions 71 are left as it is).

In such assembling step, as illustrated in FIG. 23, the gap C2 having the width that is non-uniform along the bearing surface S1 and in the direction N orthogonal to the rotation direction R is formed between the foil front end 321 and the foil rear end 322 of each of the foil members 70. Thus, the above-mentioned non-uniform gap C1 can be formed between the rear end 322 and the front end 321 of different foils (32-2 and 32-3) located on the rear side (side opposite to the bearing gap side) and the front side (bearing gap side) of the intermediate foil 32-1.

Figure 24:
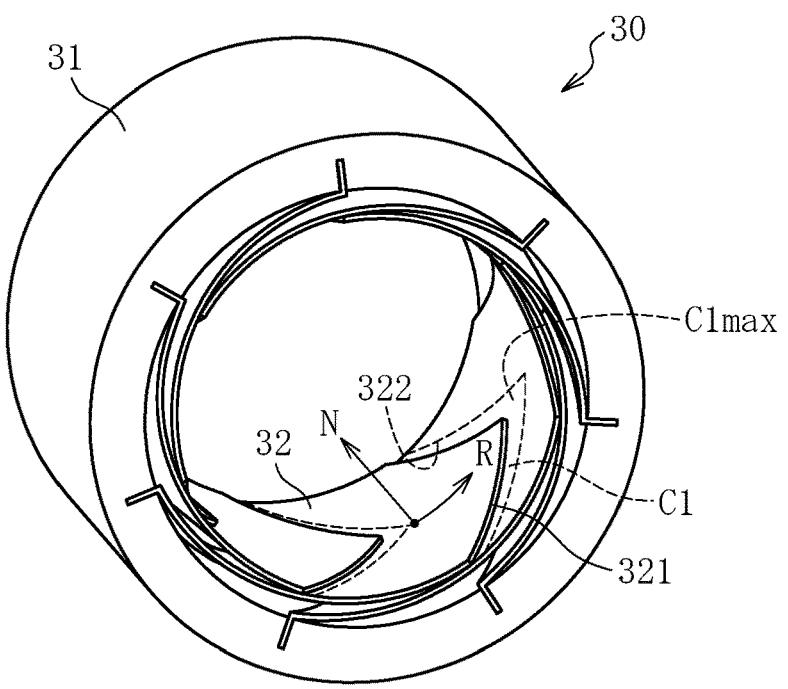
FIG. 24 is a perspective view for illustrating a radial foil bearing according to another embodiment of the present invention.

The assembling procedure for the radial foil bearing 30 is not limited to the above-mentioned procedure using the two foil members 70 each integrally comprising the plurality of foils and the coupling portion 71. For example, also when, as illustrated in FIG. 24, the foils 32 (not comprising the coupling portion 71) are fixed to the inner peripheral surface of the foil holder 31 one by one by a suitable method (press-fitting, welding, bonding, or the like), a similar effect can be obtained by forming the above-mentioned gap C1. Also in each of the first thrust foil bearing 40 and the second thrust foil bearing 50 illustrated in FIG. 6A and FIG. 6B, similarly to FIG. 24, each of the foils 42 and 52 may be mounted to each of the foil holders 41 and 51 one by one. In this case, a similar effect can be obtained by forming the above-mentioned gap C1.

Further, in FIG. 22 to FIG. 24, the case in which each of top portions 321a and 322a of the foil front end 321 having a protruding shape and the foil rear end 322 having a recessed shape is formed into an acute shape (V-shape) is exemplified. However, the shapes of the top portions 321a and 322a are arbitrary, and, similarly to the thrust foil bearings 40 and 50 illustrated in FIG. 6A, FIG. 6B, and FIG. 7, each of the top portions 321a and 322a can be formed into an arc shape. In contrast, the foil front end 421 having a protruding shape and the foil rear end 422 having a recessed shape of the first thrust foil bearing 40 (including the second thrust foil bearing 50) illustrated in FIG. 6A, FIG. 6B, and FIG. 7 can each be formed into an acute shape similarly to the radial foil bearing 30 illustrated in FIG. 22 to FIG. 24. Further, the present invention is also applicable to a case in which the front ends 321 and 421 or the rear ends 322 and 422 are each formed in a spiral pattern instead of a herringbone pattern.

Further, the assembling procedure for each of the foil bearings 30, 40, and 50 is not limited to the procedure described above, and an arbitrary assembling procedure can be employed as long as the foils each comprising the top foil portion Tf and the back foil portion Bf can be arranged at a plurality of portions in the rotation direction.

The thrust foil bearings and the radial foil bearing according to the present invention are applicable not only to the gas turbine described above, but may also be used as a bearing configured to support a rotor of a supercharger, for example. Further, the foil bearing according to the present invention may be used not only as turbo machines such as the gas turbine and the supercharger, but widely used also as bearings for vehicles such as automobiles, which are used under restrictions such as a difficulty in lubricating with a liquid such as a lubricating oil, a difficulty in separately arranging an auxiliary device of a lubricating oil circulatory system in view of energy efficiency, or problems that may be caused by shearing resistance of the liquid. The foil bearing according to the present invention may be widely used also as bearings for industrial devices.

The foil bearings described above are each an air dynamic pressure bearing that uses air as a pressure generating fluid. However, the present invention is not limited thereto, and other gases or liquids such as water and oil may be used as the pressure generating fluid. Further, in the above description of the radial foil bearing 30, the first thrust foil bearing 40, and the second thrust foil bearing 40, the shaft member 11 is configured to be rotated. However, the present invention is also applicable to a case in which, conversely, the foil holders 31, 41, and 51 are configured to be rotated.

REFERENCE SIGNS LIST 11 shaft member
30 radial foil bearing
31 foil holder
32 foil
40 first thrust foil bearing
41 foil holder
42 foil
60 foil member
61 coupling portion
70 foil member
71 coupling portion
62 slit
80 intermediate product
321 front end
322 rear end
421 front end
421a top portion
422 rear end
422a top portion
423 lateral end
424 lateral end
Bf back foil portion
C1 gap
C2 gap
F shearing force
N direction orthogonal to rotation direction
R rotation direction
S1 bearing surface
S2 bearing surface
Tf top foil portion

The invention claimed is:

1. A foil bearing comprising a plurality of foils which are arranged at a plurality of portions in a rotation direction of a shaft member to be supported,
wherein each of the foils has a front end located on a rotation direction side and a rear end located on a side opposite to the rotation direction side,
wherein each of the foils each forms a top foil portion comprising a bearing surface in a region including the front end of the foil and a back foil portion that is arranged behind the top foil portion of an adjacent one of the foils in a region including the rear end of the foil,
wherein, of two of the foils adjacent to any one of the foils in the rotation direction and a direction opposite to the rotation direction, a gap in the rotation direction is secured between the rear end of the foil on the rotation direction side and the front end of the foil on the side opposite to the rotation direction side, and
wherein a width of the gap is set to be non-uniform in a direction orthogonal to the rotation direction.

2. The foil bearing according to claim 1, wherein, of the two of the foils, the rear end of the foil on the rotation direction side and the front end of the foil on the side opposite to the rotation direction side have contour shapes different from each other.

3. The foil bearing according to claim 2,
wherein, of the two of the foils, the rear end of the foil on the rotation direction side is formed into a recessed shape, and the front end of the foil on the side opposite to the rotation direction side is formed into a protruding shape, and
wherein a width of the gap formed by a top portion of the front end of the foil and a top portion of the rear end of the foil is set to be larger than a width of another region of the gap.

4. The foil bearing according to claim 3,
wherein the top portion of the front end of the foil and the top portion of the rear end of the foil are each formed into an arc shape, and
wherein a curvature radius of the top portion of the front end of the foil is set larger than a curvature radius of the top portion of the rear end of the foil.

5. The foil bearing according to claim 2, wherein, of two lateral ends located on both lateral sides at the front end of the foil, the width of the gap is set larger on one lateral end than on another lateral end.

6. A manufacturing method for a foil bearing,
the foil bearing comprising a plurality of foils which are arranged at a plurality of portions in a rotation direction of a shaft member to be supported,
each of the foils having a front end located on a rotation direction side and a rear end located on a side opposite to the rotation direction side,
each of the foils forming a top foil portion comprising a bearing surface in a region including the front end of the foil and a back foil portion that is arranged behind the top foil portion of an adjacent one of the foils in a region including the rear end of the foil,
the manufacturing method comprising:
forming a plurality of foil members each integrally comprising the plurality of foils and a coupling portion for coupling the foils, the front end and the rear end between adjacent foils of each of the foil members having contour shapes different from each other; and
introducing the foils of another of the foil members into parts between the adjacent foils of one of the foil members so that the foils are partially overlapped with each other, to thereby form the top foil portion and the back foil portion.

7. An intermediate product for manufacturing a foil bearing,
the foil bearing comprising a plurality of foils which are arranged at a plurality of portions in a rotation direction of a shaft member to be supported, wherein each of the foils has a front end located on a rotation direction side and a rear end located on a side opposite to the rotation direction side, wherein each of the foils forms a top foil portion comprising a bearing surface in a region including the front end of the foil and a back foil portion that is arranged behind the top foil portion of an adjacent one of foils in a region including the rear end of the foil, wherein the intermediate product comprises a plurality of foil members each integrally comprising the plurality of foils and a coupling portion for coupling the foils, the front end and the rear end between adjacent foils of each of the foil members having contour shapes different from each other, and wherein the foils of another of the foil members are introduced into parts between the adjacent foils of one of the foil members so that the foils are partially overlapped with each other, to thereby form the top foil portion and the back foil portion.

* * * * *